US008130771B2

(12) United States Patent
Cakulev et al.

(10) Patent No.: US 8,130,771 B2
(45) Date of Patent: Mar. 6, 2012

(54) PACKET-FORWARDING FOR PROXY MOBILE IP

(75) Inventors: Violeta Cakulev, Morris Plains, NJ (US); Ajay Rajkumar, Morristown, NJ (US); Ganapathy Subramanlan Sundaram, Hillsborough, NJ (US)

(73) Assignee: Alcatel Lucent, Paris (FR)

( * ) Notice: Subject to any disclaimer, the term of this patent is extended or adjusted under 35 U.S.C. 154(b) by 780 days.

(21) Appl. No.: 11/905,888

(22) Filed: Oct. 5, 2007

(65) Prior Publication Data
US 2008/0095118 A1    Apr. 24, 2008

Related U.S. Application Data

(60) Provisional application No. 60/850,709, filed on Oct. 10, 2006.

(51) Int. Cl.
*H04L 12/28* (2006.01)
*H04L 9/32* (2006.01)
*H04W 4/00* (2009.01)

(52) U.S. Cl. ................... 370/401; 455/433; 713/171

(58) Field of Classification Search ............ None
See application file for complete search history.

(56) References Cited

U.S. PATENT DOCUMENTS

| | | | | |
|---|---|---|---|---|
| 6,993,039 | B2 * | 1/2006 | Borella | 370/401 |
| 7,068,640 | B2 * | 6/2006 | Kakemizu et al. | 370/349 |
| 7,173,932 | B2 * | 2/2007 | Miki et al. | 370/389 |
| 7,269,173 | B2 * | 9/2007 | Iyer et al. | 370/395.31 |
| 7,333,482 | B2 * | 2/2008 | Johansson et al. | 370/353 |
| 7,536,464 | B1 * | 5/2009 | Dommety et al. | 709/228 |
| 7,539,202 | B2 * | 5/2009 | Thubert et al. | 370/401 |
| 7,602,748 | B2 * | 10/2009 | Sinnreich et al. | 370/331 |
| 7,616,597 | B2 * | 11/2009 | Liu et al. | 370/328 |
| 7,616,954 | B2 * | 11/2009 | Jiang | 455/432.1 |
| 2003/0193952 | A1 * | 10/2003 | O'Neill | 370/392 |
| 2004/0078600 | A1 * | 4/2004 | Nilsen et al. | 713/201 |
| 2005/0130659 | A1 * | 6/2005 | Grech et al. | 455/436 |
| 2005/0163078 | A1 | 7/2005 | Oba et al. | |
| 2006/0025133 | A1 * | 2/2006 | Shaheen | 455/433 |

(Continued)

FOREIGN PATENT DOCUMENTS

JP    2003-338850    11/2003

(Continued)

OTHER PUBLICATIONS

Madjid Nakhjiri Narayanan Venkitaraman Motorola Labs: "EAP Based PRoxy Mobile IP Key Bootstrappinhg for WiMAX; draft-nakjiri-pmip-key-01.txt" IETF Standard-working-Draft, Internet Engineering Task Force, IETF, CH, No. 1, Jan. 2006, XPo15044435, ISSN: 0000-0004, pp. 1-5.

(Continued)

*Primary Examiner* — Gregory Sefcheck
(74) *Attorney, Agent, or Firm* — Harness, Dickey & Pierce, P.L.C.

(57) ABSTRACT

The packet-forwarding for proxy mobile IP, in accordance with various embodiments, includes registering a mobile access terminal (AT) and a first IP gateway (IPGW) with a home agent (HA) when a wireless communication session is established between the mobile AT and the first IPGW. In various embodiments the method additionally includes transferring context information regarding the mobile AT and a proxy mobile security key obtained by the first IPGW, from the first IPGW to a second IPGW when the mobile AT moves from a first access network to a second access network.

20 Claims, 5 Drawing Sheets

U.S. PATENT DOCUMENTS

2007/0189218 A1* 8/2007 Oba et al. .............. 370/331
2008/0040793 A1* 2/2008 Nilsen et al. .............. 726/15

FOREIGN PATENT DOCUMENTS

| JP | 2004-320371 | 11/2004 |
| JP | 2006-203580 | 8/2006 |
| WO | WO 2006/021236 | 3/2006 |

OTHER PUBLICATIONS

Madjid Nakhjiri Narayanan Venkitaraman Motorola Labs: "EAP based Proxy Mobile IP key bootstrapping for WiMAX; draft-nakhjiri-pmip-key-01.txt" IETF Standard-Working-Draft, Internet Engineering Task Force, IETF, Ch, No. 1, Jan. 2006, XP015044435, ISSN: 0000-0004.

International Preliminary Report of Patentability dated Apr. 23, 2009.

Korean Office Action dated Aug. 18, 2010 in corresponding Korean Application No. 10-2009-7007214, with English translation.

Joachim Sachs, "A Generic Link Layer for Future Generation Wireless Networking", IEEE, pp. 834-838 (2003), Ericsson Research, Corporate Unit, Ericsson Eurolab Deutschland GmbH.

Min-hua Ye et al., "The Mobile IP Handoff Between Hybrid Networks", IEEE, (2002), School of Information Engineering, Beijing University of Posts and Telecommunications.

Japanese Office Action dated Jun. 22, 2011, for Application JP 2009-532377 and English translation thereof.

* cited by examiner

FL ROUTING
CM->MN ROUTING CONSISTS OF CN->HA AND HA->MN

CN->HA
IPv6 HEADER
   SOURCE: CNA
   DESTINATION:HoA HA->MN (ROUTING HEADER OPTION + TUNNELING)
HA->PDSN1
IPv6 ROUTING HEADER OPTION (OUTER)
   SOURCE: HAA
   DESTINATION: PDSN1
      ADDRESS[1]=CCoa
IPv6 HEADER (INNER)
   SOURCE: CNA
   DESTINATION: HoA
PDSN1->MN
IPv6 ROUTING HEADER OPTION (OUTER)
   SOURCE: HAA
   DESTINATION: CCoA
      ADDRESS[1]=PDSN1
IPv6 HEADER (INNER)
   SOURCE:CNA
   DESTINATION: HoA AFTER HANDOFF
HA->MN (ROUTING HEADER OPTION + TUNNELING?)
HA->PDSN2
IPv6 ROUTING HEADER OPTION (OUTER)
   SOURCE: HAA
   DESTINATION: PDSN2
      ADDRESS[1]=CCoa
IPv6 HEADER (INNER)
   SOURCE: CNA
   DESTINATION: HoA
PDSN2->MN
IPv6 ROUTING HEADER OPTION (OUTER)
   SOURCE: HAA
   DESTINATION: CCoA
      ADDRESS[1]=PDSN2
IPv6 HEADER (INNER)
   SOURCE:CNA
   DESTINATION: HoA RL ROUTING
MN->CN ROUTING CONSISTS OF
    MN->HA AND HA->CN MN->HA
IPv6HEADER (OUTER)
   SOURCE:CCoA
   DESTINATION: HAA
IPv6 HEADER (INNER)
   SOURCE:HoA
   DESTINATION: CNA HA->CN
IPv6 HEADER
   SOURCE:HoA
   DESTINATION: CNA

FIG.5

PACKET-FORWARDING FOR PROXY MOBILE IP

CROSS-REFERENCE TO RELATED APPLICATIONS

This application claims the benefit of U.S. Provisional Application No. 60/850,709, filed on Oct. 10, 2006. The disclosure of the above application is incorporated herein by reference in its entirety.

BACKGROUND

The statements in this section merely provide background information related to the present disclosure and may not constitute prior art.

The present teachings relate to packet routing for a mobile access terminal moving between two access nodes.

In wired IP networks, a client and a server identify and communicate with each other using each other's Internet Protocol (IP) address. Every IP packet carries the sender's IP address (source IP address) and the recipient's IP address (destination IP address). Intermediate routers and switches look at the source/destination IP addresses to route packets from source to destination. Methods to route packets based on IP addresses in a packet are well known. Typically, the client's IP address is either permanent or dynamically assigned. In either case, the address is decided by an address manager server typically known as a DHCP server and all clients within a subnet share a fair bit of commonality in their address.

In effect, this creates a hierarchy of how addresses are managed and administered and is done with a view towards helping routing and forwarding processes that process IP addresses. However, in wireless networks, mobile clients, or access terminals (ATs), move around and do not initiate sessions from the same locations. One could argue that every time an AT moves from one access point (AP) or base station to another, then the IP address changes. This creates two problems: first, changing IP addresses for ATs is not easy; and second, routers need to somehow be updated with the new address so that packets from a server, also referred to as a Correspondent Node (CN), for the same mobile AT can now be routed differently.

These problems are addressed by the so-called MobileIP standards and protocols, which provide a framework for accomplishing IP address management and routing for mobile ATs. The basic idea is to have a "home address" (HoA) that does not change for the mobile AT, and to additionally have a "care of address" (CoA) that is related to the location of the AT (typically based on the access network's IP address). The CoA is allowed to change when the mobile AT moves from one node to another. In this framework, the HoA and CoA are "bound" to each other using Mobile IP protocols, e.g., MIPv4, MIPv6, etc., at a home agent (HA), which knows both the CoA and the HoA of the mobile and maintains the binding relationships. Hence, when a CN sends a packet to a mobile AT, the packet is routed through the HA which, in turn, sends the packet to the access network or node at which the mobile AT is currently located. Generally, there are two types of mechanisms to assign the CoA. The first method uses a CoA that is located in the network, for example, the CoA of every mobile AT attached to a given access network element, e.g., a PDSN, could be equal to the IP address of the PDSN. In the second method, the mobile AT generates its own CoA based on the network prefix of the access network or the mobile AT is assigned a specific CoA by the access network. This method of generating a CoA is often referred to as a Co-located CoA or (C-CoA).

However, when using a C-CoA for the mobile AT, handoff cannot be managed entirely by the access network. That is, the C-CoA is calculated by the mobile AT and has to be registered at the HA. Generally, the C-CoA is calculated based on a network prefix of the access network and a permanent identifier that is specific to the mobile AT. Typically, the network prefix is obtained through a router advertisement from the access network element that mobile AT is anchored with, e.g., a PDSN.

Generally, there are two types of mobile IP protocols, i.e., terminal based client mobile IP (CMIP) and network based proxy mobile IP (PMIP). In CMIP all the binding relationships are initiated by the mobile AT, while in PMIP all the binding relationships are initiated by network elements on behalf of the mobile AT.

In client mobile IP (CMIP), interactions involve the mobile AT, a home agent (HA), an authentication, authorization and accounting (AAA) infrastructure, and possibly a gateway in a network, such as a packet data service node (PDSN). Typically, establishing a CMIP session, given the number of interactions and network elements, is "slow" and may take anywhere between a few 10's of milliseconds to a few 100's of milliseconds. In proxy mobile IP (PMIP), since mobility management is done by the network, establishing PMIP sessions can be significantly faster. However, in order to establish PMIP sessions, security issues have to be addressed.

SUMMARY

In accordance with various embodiment of the present disclosure, a method for network based mobility management is provided. The method may include registering a mobile access terminal (AT) and a first IP gateway (IPGW) with a home agent (HA) when a wireless communication session is established between the mobile AT and the first IPGW. The method additionally may include transferring context information regarding the mobile AT and a proxy mobile security key obtained by the first IPGW, from the first IPGW to a second IPGW when the mobile AT moves from a first access network to a second access network.

In accordance with various other embodiment of the present disclosure, a method for network based mobility management is provided that may include establishing a proxy link between a first IP gateway (IPGW) and a home agent (HA) utilizing a proxy mobile home agent routing key obtained by the first IPGW, when a mobile IP session is initiated between a mobile access terminal (AT) and the first IPGW. The method may additionally include registering the AT with the HA by establishing a link between the home agent and the AT using the same proxy mobile home agent routing key used to establish the proxy link. In various implementations, the method may further include transferring context information regarding the mobile AT and the proxy mobile home agent routing key from the first IPGW to a second IPGW when the mobile AT changes from communicating with a first access network to communicating with a second access network. Still further, the method may includes establishing a link between the second IPGW and the HA utilizing the context information and the proxy mobile home agent route key acquired from the first IPGW to provide a tunnel for data packets to flow between the mobile AT and the HA, via the second IPGW.

In still other embodiments of the present disclosure, a method for network based mobility management is provided that may include registering a mobile access terminal (AT) with a home agent (HA) when a mobile IP session is initiated between the mobile AT and a first IP gateway (IPGW). Additionally, the method may include registering the first IPGW with the HA by establishing a proxy link between the first IPGW and the HA utilizing a proxy mobile home agent routing key obtained by the first IPGW from an authentication, authorization and accounting (AAA). Furthermore, the method may include transferring context information regarding the mobile AT and the proxy mobile home agent routing key from the first IPGW to a second IPGW when the mobile AT hands-off communication with a first access network linked to the first IPGW to a second access network linked to the second IPGW. Further yet, the method may include establishing a link between the second IPGW and the HA utilizing the context information and the proxy mobile home agent route key acquired from the first IPGW to provide a tunnel for data packets to flow between the mobile AT and the HA, via the second access network and the second IPGW.

Further areas of applicability of the present teachings will become apparent from the description provided herein. It should be understood that the description and specific examples are intended for purposes of illustration only and are not intended to limit the scope of the present teachings.

BRIEF DESCRIPTION OF THE DRAWINGS

The drawings described herein are for illustration purposes only and are not intended to limit the scope of the present teachings in any way.

DETAILED DESCRIPTION OF EXAMPLE EMBODIMENTS

Example embodiments will now be described more fully with reference to the accompanying drawings. However, example embodiments may be embodied in many different forms and should not be construed as being limited to the example embodiments set forth herein. Example embodiments are provided so that this disclosure will be thorough, and will fully convey the scope to those who are skilled in the art. In some example embodiments, well-known processes, well-known device structures, and well-known technologies are not described in detail to avoid the unclear interpretation of the example embodiments. Throughout the specification, like reference numerals in the drawings denote like elements.

Additionally, it will be understood that, although the terms first, second, third, etc. may be used herein to describe various elements and/or, components, these elements and/or components should not be limited by these terms. These terms may be only used to distinguish one element or component, from another element or component. Thus, a first element or component discussed below could be termed a second element or component without departing from the teachings of the example embodiments.

Furthermore, the terminology used herein is for the purpose of describing particular example embodiments only and is not intended to be limiting. As used herein, the singular forms "a", "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Still further, unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In various embodiments, the present disclosure provides structure and methods for creating a binding between a mobile access terminal's (AT's) home address (HoA) and care of address (CoA) utilizing proxy mobile IP (PMIP). As used herein, the HoA is a fixed IP address for the mobile AT that does not change as the mobile AT moves and the CoA is a temporary IP address for the mobile AT that is allowed to change based on the location of the mobile AT. The binding between a mobile AT's HoA and CoA eliminates interactions with the mobile AT during handoffs, i.e., when communication with the mobile AT changes from one access node (AN) to another access node (AN). For example, in various implementations, a HoA and a CoA are assigned for every mobile AT and a binding relationship is established between the addresses for the mobile AT at the home agent (HA). More particularly, the HoA is fixed, e.g., permanently or alternatingly with every session, but the CoA of the mobile AT may change when the mobile AT moves and is handed off. Moreover, the mobile AT generates its own CoA based on the network prefix of the first IP gateway (IPGW), or access network gateway, e.g., a PDSN, with which the mobile AT establishes a connection. However, in a centralized architecture, where multiple base stations may be connected to the same IP gateway the CoA may change with every IP gateway.

Additionally, in various embodiments, the structure and methods of present disclosure do not require router advertisements from the IP gateway (IPGW), subsequent to a handoff, because the CoA, or the network based CoA, is re-computed by the new IPGW, e.g., a new PDSN, to which the mobile AT is anchored. However, since the CoA is computed by the mobile AT during session setup, the network prefix of the first point of attachment needs to be communicated to the mobile AT the very first time. Alternatively, as described above, a CoA may not necessarily be computed by the mobile AT only and in some cases may be assigned by the access gateway. For example, in a mobile IPv4 scenario, the access gateway's IP address may be used as the mobile AT's CoA.

The following conventions will be utilized herein. In the exemplary embodiments described herein the IP gateway (IPGW), or network element that assumes proxy responsibilities for each mobile AT can sometimes be referred to herein as a packet data service node (PDSN), as applicable to current EvDO networks. However, it should be understood that such a network element can be any IPGW that can provide IP layer mobility functions, and remain within the scope of the present disclosure. Additionally, when a handoff occurs between one IPGW to another, the first IPGW will be referred to herein as the serving IPGW, and the second IPGW will be referred to herein as the target IPGW. Furthermore, the terms mobile node (MN), mobile station (MS) and mobile access terminal (AT) will be inter-changeably utilized herein. Further yet, all the exemplary messages and formats described herein are based on terminology applicable to current and emerging 3GPP2 based EvDO systems. However, it should be understood that the methods described herein are more broadly applicable to any system, for example, WiMAX, 3GPP based LTE, etc. and such broad applications remain within the scope of the present disclosure.

Figure 1:
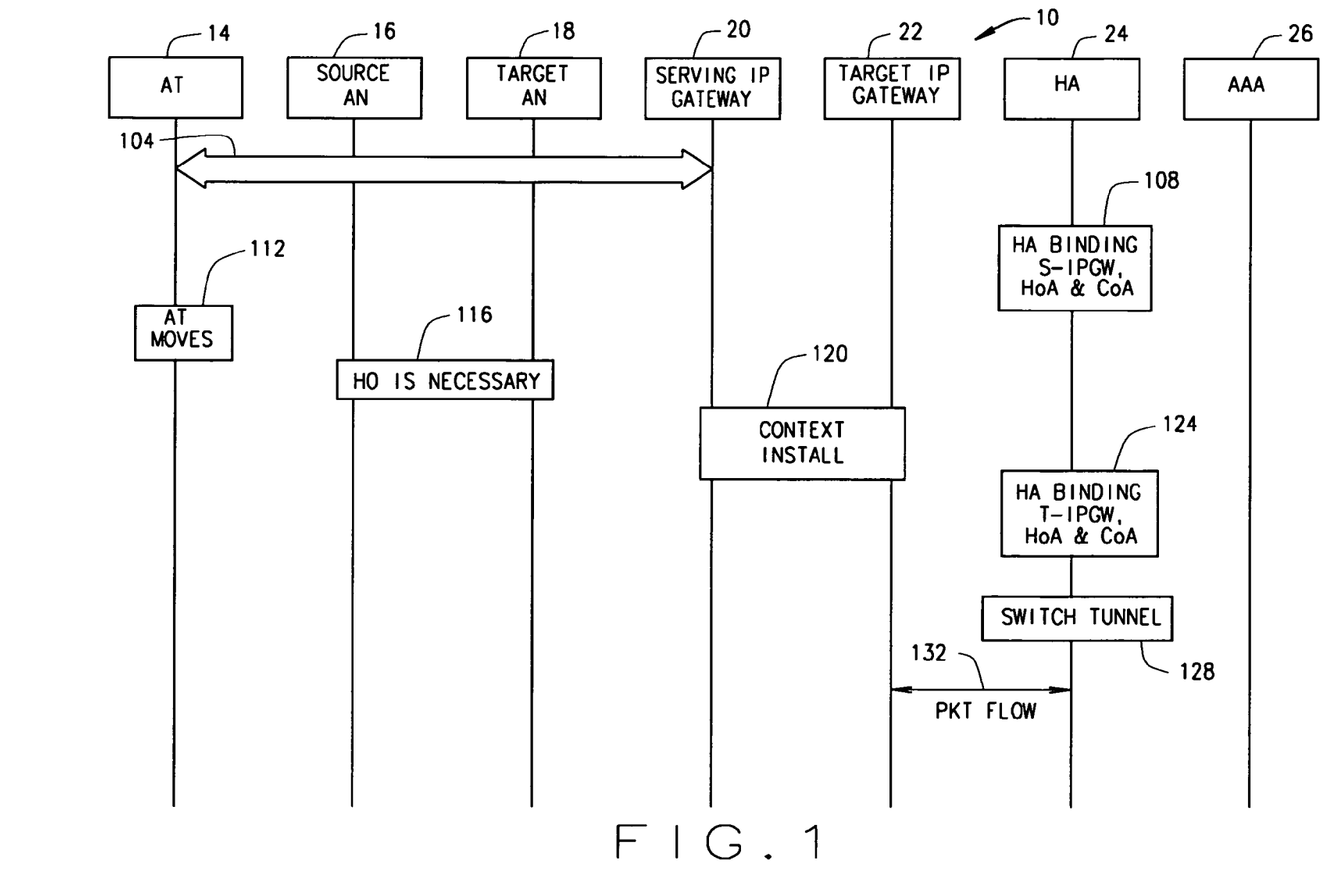
FIG. 1 is an illustration of the operation of an IP gateway to IP gateway interface within a wireless network, in accordance with various embodiments of the present invention.

FIG. 1 illustrates the operation of an IPGW to IPGW interface within a wireless communication network 10, in accordance with various embodiments of the present invention. Generally, the network 10 includes a mobile access terminal (AT) 14, a first or source access node (AN) 16, a second or target AN 18, a first or serving IP gateway (IPGW) 20, a second or target IPGW 22, a home agent (HA) 24 and an authentication, authorization and accounting server (MA) 26. In various embodiments, when an access terminal user initiates wireless communication, via network 10, a mobile IP session is established between the mobile AT 14 and the serving IPGW 20, via the source access network 16 with which the AT 14 has begun communicating, as indicated at 104. The mobile AT can be any wireless communication device such as a laptop, PDA, cellular phone, etc. Once the session is established between the mobile AT 14 and the serving IPGW 20, both the serving IPGW 20 and the mobile AT 14 register with the HA 24, as indicated at 108. More specifically, the mobile AT 14 establishes connectivity with the HA 24, the serving IPGW 20 establishes a proxy link with the HA 24 and binding is created at the HA 24. The binding binds the serving IPGW 20 with the HoA and the CoA of the mobile AT 14.

Subsequent to creating the binding at 108, if the mobile AT 14 moves (e.g., stops communicating with the source AN 16 and begins communicating with the target AN 18 that is connected to the target IPGW 22) a handoff of data routing between the HA 24 and the serving IPGW 20 to data routing between HA 24 and the target IPGW 22 is necessitated, as indicated at 112 and 116. In various embodiments, to accomplish the handoff, a secure connection between the serving IPGW 20 and the target IPGW 22 is established. Then the context information regarding the mobile AT 14 and a proxy mobile security key obtained by the serving IPGW 20 from the AAA 26 is transferred from the serving IPGW 20 to the target IPGW 22, as indicated at 120. More particularly, the exchange of mobile AT context information between the target IPGW 22 and the serving IPGW 20 is completed without communicating with the mobile AT 14 or the AAA 26. Thus, the acquisition of the context information by the target IPGW 22 is transparent to the mobile AT 14.

Once the mobile AT context information is acquired by the target IPGW, a binding is created at the HA 24 binding the target IPGW 22 with the HoA and the CoA of the mobile AT 14, as indicated at 124. The binding creates a tunnel between the HA 24 and the target IPGW 22, to which the mobile AT 14 is connected via the target AN 18, as indicated at 128. Therefore, data packets can flow between the HA 24 and the target IPGW 22, and subsequently to and from the mobile AT 14, as indicated at 132.

If the mobile AT 14 moves again, and begins communicating with a new target AN (not shown) connected to a new IPGW (not shown) the mobile AT context information would be transferred to the new IPGW as described above at 120. Additionally, a binding of the new IPGW with the HoA and the CoA of the mobile AT 14 would be created as described above at 124, to open a tunnel and allow packet flow between the HA 24 and the new IPGW, as described above at 128 and 132.

Figure 2:
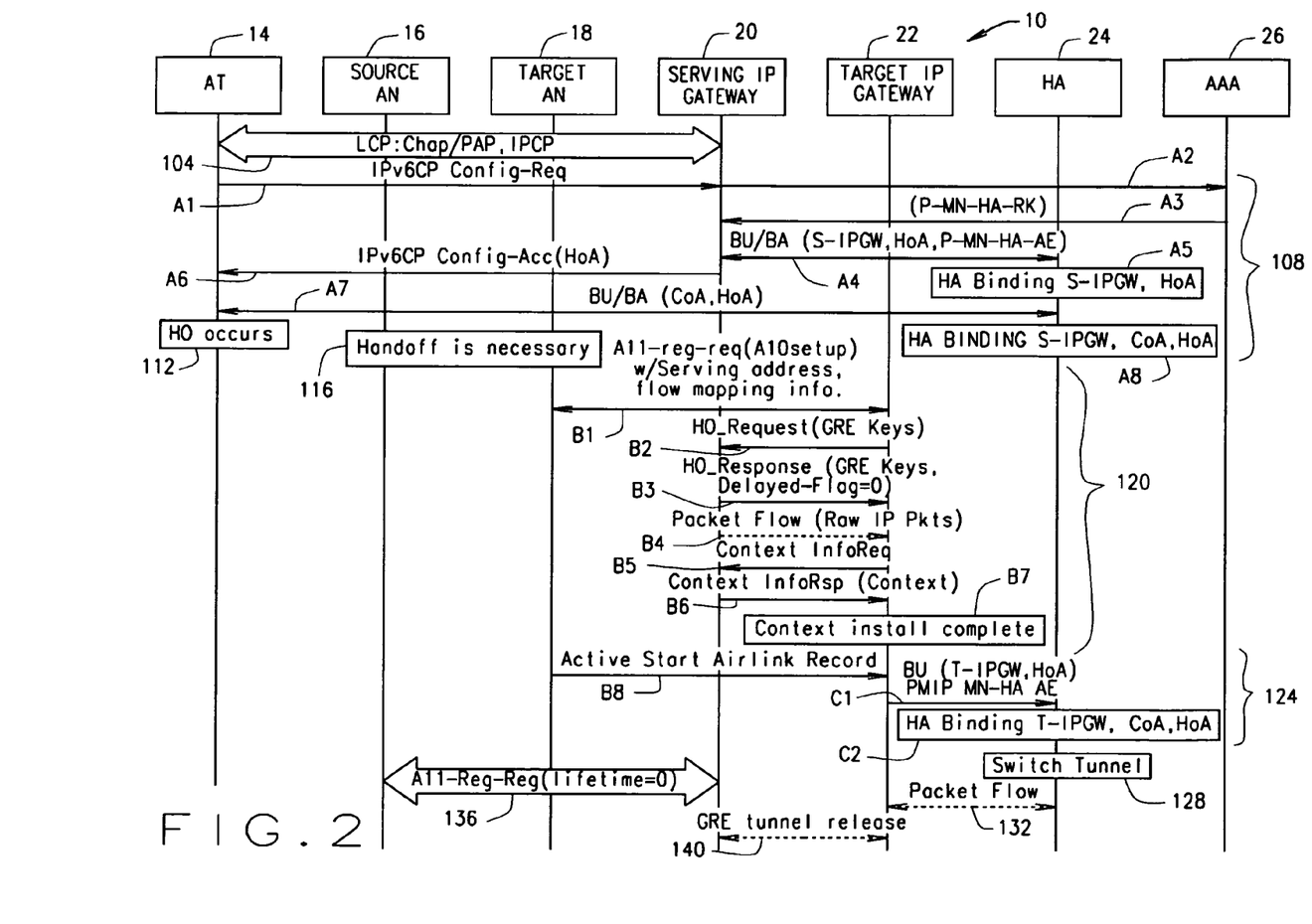
FIG. 2 is an illustration of the IP gateway to IP gateway interface within the wireless network shown in FIG. 1, in accordance with various embodiments, wherein an IPv6 protocol is implemented.

FIG. 2 is an illustration of the IPGW to IPGW interface within the wireless network 10, as implemented utilizing an IPv6 protocol, in accordance with various embodiments. As described above, when an access terminal user initiates wireless communication, a mobile IP session is established between the mobile AT 14 and the serving IPGW 20, as indicated at 104. In various embodiments, the mobile IP session can be established with a suitable link control protocol (LCP), using Chap or PAP for authentication and authorization to establish a secure link.

In accordance with various embodiments, registration of the serving IPGW 20 and the mobile AT 14 with the HA 24, indicated at 108, can include the following sequence of operations. Initially, the mobile AT 14 sends a configuration request to the serving IPGW 20, as indicated at 108-A1, so that the mobile AT 14 can begin to obtain a HoA from the HA 24. The configuration request at 108-A1 triggers a proxy mobile IP (PMIP) session within network 10. The serving IPGW 20 intercepts the configuration request from the mobile AT 14 and sends a subsequent configuration request to the AAA 26 to obtain a proxy mobile security key, as indicated at 108-A2. Accordingly, the AAA 26 recognizes that mobile AT 14 has the capability of doing both client based mobile IP as well as proxy based mobile IP. The AAA 26 then returns a response to the serving IPGW 20, as indicated at 108-A3, that includes information about the HA 24 with which the serving IPGW 20 will be communicating. For example the information may include a HoA, as well as a security key, e.g., a proxy mobile node home agent route key, to establish the association between the serving IPGW 20 and the HA 24.

Once the serving IPGW 20 receives the information at 108-A3, the serving IPGW 20 sends a binding update (BU) message to the HA 24 using the security key acquired at 108-A3, as indicated at 108-A4. Additionally, the HA 24 returns a binding acknowledgement (BA) back to the serving IPGW 20, as also indicated at 108-A4, thereby completing registration of the serving IPGW 20 with the HA 24. Thus, a proxy link between the serving IPGW 20 and the HA 24 has been established and a binding has been created at the HA 24 binding the serving IPGW 20 with the HoA of the mobile AT 14, as indicated at 108-A5.

At 108-A6, the serving IPGW 20 sends a configuration accept message to the mobile AT 14 that includes the HoA. At 108-A7, the mobile AT 14 calculates a CoA specific to the mobile AT 14 and sends a binding update (BU) to the HA 24. The HA 24 then sends a binding acknowledgement (BA) back to the mobile AT 14, as also indicated at 108-A7, thereby completing registration of the mobile AT 14 with the HA 24. The HA 24 then updates the binding created at 108-A5 with the CoA, to thereby bind the serving IPGW 20, the HoA and CoA, as indicated at 108-A8.

As described above, at 112 and 114, the mobile AT 14 moves (e.g., stops communicating with the source AN 16 and begins communicating with the target AN 18 that is connected to the target IPGW 22). Therefore, a handoff of data routing between the HA 24 and the serving IPGW 20, to data routing between HA 24 and the target IPGW 22, is necessitated. In accordance with various embodiments, the transfer of mobile AT context information from the serving IPGW 20 to the target IPGW 22, as indicated at 120, can include the following sequence of operations. Initially, a tunnel is established between the target AN 18 and the target IPGW 22, as indicated at 120-B1. To establish the tunnel any suitable signaling and data interfaces, such as A-10, A-11, etc., can be utilized.

Once the tunnel is established at 120-B1, the target IPGW 22 acquires information about the mobile AT 14 and the security key, e.g., the proxy mobile node home agent route key, so that the HA 24 can exchange data to and from the mobile AT 14 with target IPGW 22. In various embodiments, the target IPGW 22 acquires the needed mobile AT information from the serving IPGW 20 without having to communicate with the mobile AT 14 or the AAA 26. Particularly, to acquire the mobile AT information, the target IPGW 22 establishes a secure connection with the serving IPGW 20, as indicated at 120-B2 and 120-B3. In various embodiments, the secure connection between the serving IPGW 20 and the target IPGW 22 can be established using generic routing and encapsulation (GRE) protocol keys.

At 120-B4, 120-B5 and 120-B6, the serving IPGW 20 and target IPGW 22 exchange raw data and the target IPGW acquires the mobile AT context information and security key, e.g., a proxy mobile node home agent route key. Once the target IPGW 22 has completed acquiring the mobile AT context information and the security key from the serving IPGW 20, as indicated at 120-B7, a new record has is generated for the mobile AT 14 between the target AN 18 and the target IPGW 22, as indicated at 120-B8.

Subsequently, the target IPGW 22 sends a binding update (BU) message to the HA 24 using the security key acquired from the serving IPGW 20, to bind the target IPGW 22 with the HoA and CoA, as indicated at 124-C1 and 124-C2. Once the binding is established at 124-C2, a tunnel is set up between the target IPGW 22 and the HA 24 so that packets to and from the mobile AT 14 can begin to be routed via the target IPGW 22, as indicated at 128 and 132.

Once the tunnel between the target IPGW 22 and the HA 24 has been established, and data begins to be routed between the target IPGW 22 and the HA 24, the source AN 16 relinquishes responsibilities for the mobile AT 14, and similarly, the serving IPGW 20 informs the target IPGW 22 that it is releasing responsibility for the mobile AT 14, as indicated at 136 and 140.

Figure 3:
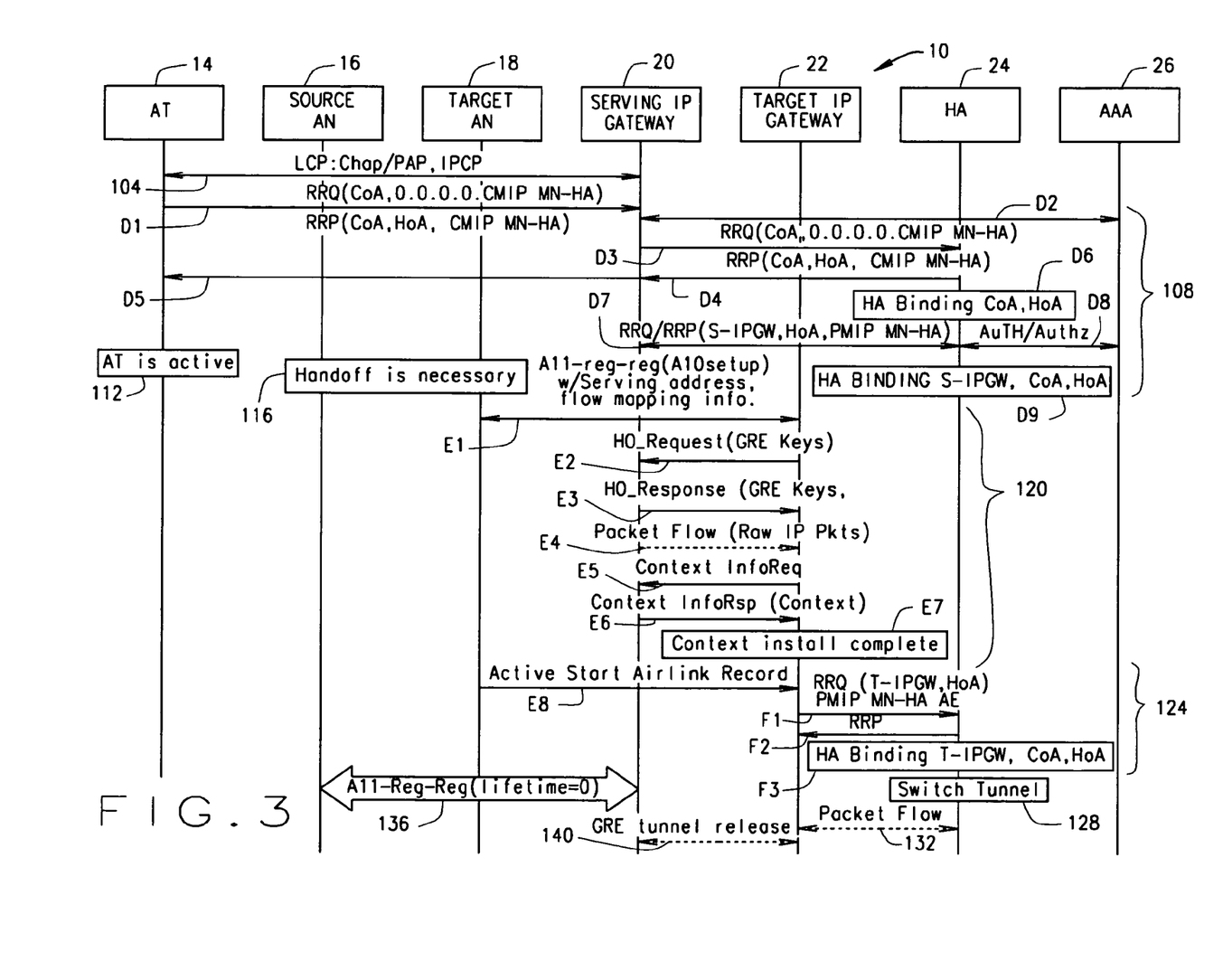
FIG. 3 is an illustration of the IP gateway to IP gateway interface within the wireless network shown in FIG. 1, in accordance with various embodiments, wherein an IPv4 protocol is implemented.

FIG. 3 is an illustration of the IPGW to IPGW interface within the wireless network 10, as implemented utilizing an IPv4 protocol, in accordance with various embodiments. As described above, when an access terminal user initiates wireless communication, a mobile IP session is established between the mobile AT 14 and the serving IPGW 20, as indicated at 104.

In accordance with various embodiments, registration of the serving IPGW 20 and the mobile AT 14 with the HA 24, indicated at 108, can include the following sequence of operations. Initially, the mobile AT 14 sends a configuration request (RRQ), including a CoA for the mobile AT 14, to the serving IPGW 20, as indicated at 108-D1, so that the mobile AT 14 can begin to obtain a HoA from the HA 24. The serving IPGW 20 intercepts the configuration request from the mobile AT 14 and sends a request to the AAA 26 to obtain a proxy mobile security key, as indicated at 108-D2. Subsequently, the serving IPGW 20 forwards the configuration request on to the HA 24, as indicated at 108-D3. The HA 24 then returns a configuration response (RRP) to the serving IPGW 20, as indicated at 108-D4, that includes information about the HA 24 that the serving IPGW 20 will be communicating with, i.e., the HoA. The configuration response at 108-D4 triggers a proxy mobile IP (PMIP) session within network 10. The serving IPGW 20 then forwards the configuration response on to the mobile AT 14, as indicated at 108-D5. In various embodiments, the requests and response at 108-D1 through 108-D4 can be communicated utilizing client mobile IP (CMIP).

At 108-D6, a binding is created at the HA 24 binding the HA 24 the CoA and the HoA, thereby completing the registration of the mobile AT 14 with the HA 24. Once the client registration is completed the serving IPGW 20 sends binding request to the HA 24, as indicated in 108-D7. Upon receiving the binding request, the HA 24 sends a request to the AAA 26 to obtain security keys. The HA 24 receives the security key at 108-D8, and sends a binding response to the serving IPGW 20 at 108-D7, thereby completing registration of the serving IPGW 20 with the HA 24. Thus, a proxy link between the serving IPGW 20 and the HA 24 has been established and a binding has been created at the HA 24 binding the serving IPGW 20 with the CoA and the HoA of the mobile AT 14, as indicated at 108-D9.

As described above, at 112 and 114, the mobile AT 14 moves (stops communicating with the source AN 16 and begins communicating with the target AN 18 that is connected to the target IPGW 22). Therefore, a handoff of data routing between the HA 24 and the serving IPGW 20, to data routing between HA 24 and the target IPGW 22, is necessitated. In accordance with various embodiments, the transfer of mobile AT context information from the serving IPGW 20 to the target IPGW 22, as indicated at 120, can include the following sequence of operations. Initially, a tunnel is established between the target AN 18 and the target IPGW 22, as indicated at 120-E1. To establish the tunnel any suitable signaling and data interfaces, such as A-10, A-11, etc., can be utilized.

Once the tunnel is established at 120-B1, the target IPGW 22 needs to acquire information about the mobile AT 14 and the security key, e.g., the proxy mobile node home agent route key, so that the HA 24 can exchange data to and from the mobile AT 14 with target IPGW 22. In various embodiments, the target IPGW 22 acquires the mobile AT information from the serving IPGW 20 without having to communicate with the mobile AT 14 or the AAA 26. Particularly, to acquire the mobile AT information, the target IPGW 22 establishes a secure connection with the serving IPGW 20, as indicated at 120-E2 and 120-E3. In various embodiments, the secure connection between the serving IPGW 20 and the target IPGW 22 can be established using generic routing and encapsulation (GRE) protocol keys.

At 120-E4, 120-E5 and 120-E6, the serving IPGW 20 and target IPGW 22 exchange raw data and the target IPGW acquires the mobile AT context information and security key, e.g., a proxy mobile node home agent route key. Once the target IPGW 22 has completed acquiring the mobile AT context information and the security key from the serving IPGW 20, as indicated at 120-E7, a new record is generated for the mobile AT 14 between the target AN 18 and the target IPGW 22, as indicated at 120-E8.

Subsequently, the target IPGW 22 sends a binding request to the HA 24 using the security key acquired from the serving IPGW 20, and the HA 24 returns a binding response to bind the target IPGW 22 with the HoA and CoA, as indicated at 124-F1, 124-F2 and 124-F3. Once the binding is established at 124-F3, a tunnel is set up between the target IPGW 22 and the HA 24 so that packets to and from the mobile AT 14 can begin to be routed via the target IPGW 22, as indicated at 128 and 132.

Once the tunnel between the target IPGW 22 and the HA 24 has been established, and data begins to be routed therebetween, the source AN 16 relinquishes responsibilities for the mobile AT 14, and similarly, the serving IPGW 20 informs the target IPGW 22 that it is releasing responsibility for the mobile AT 14, as indicated at 136 and 140.

Figure 4:
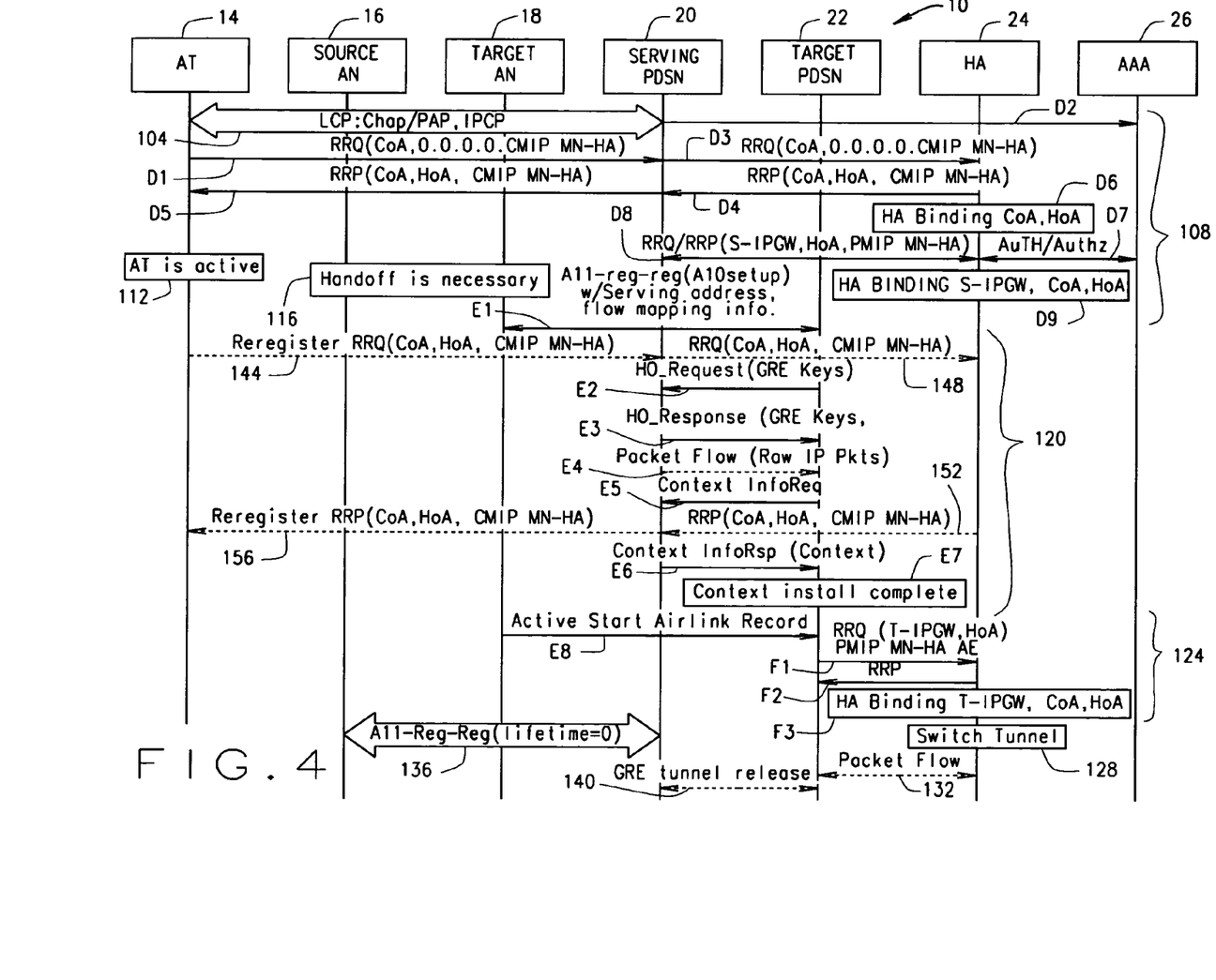
FIG. 4 is an illustration of the IP gateway to IP gateway interface within the wireless network shown in FIG. 3, wherein a delay occurs.

FIG. 4 is an illustration of the IPGW to IPGW interface within the wireless network 10, as implemented utilizing the IPv4 protocol, wherein a delay occurs, in accordance with various embodiments. In various embodiments, a tunnel between the mobile AT 14 and the HA 24 can expire, or time-out, unless a re-registration between the mobile AT 14 and the HA 24 occurs. FIG. 4 illustrates the operation of the network 10 in such instances where the tunnel expires and a re-registration requested, as indicated at 144 and 148, prior to the mobile AT context and security key exchange between the serving and target IPGWs 20 and 22, at 120. In such instances, the context installment is delayed until the serving IPGW 20 is certain that client re-registration is complete. That is the context installment is delayed until the serving IPGW 20 receives the re-registration response, as indicated in 152 and 156. However, if the re-registration request is received at the serving IPGW 20 after the mobile AT context and security key exchange between the serving and target IPGWs 20 and 22 have started (not shown in the figure), the serving IPGW 20 will reject the re-registration.

Figure 5:
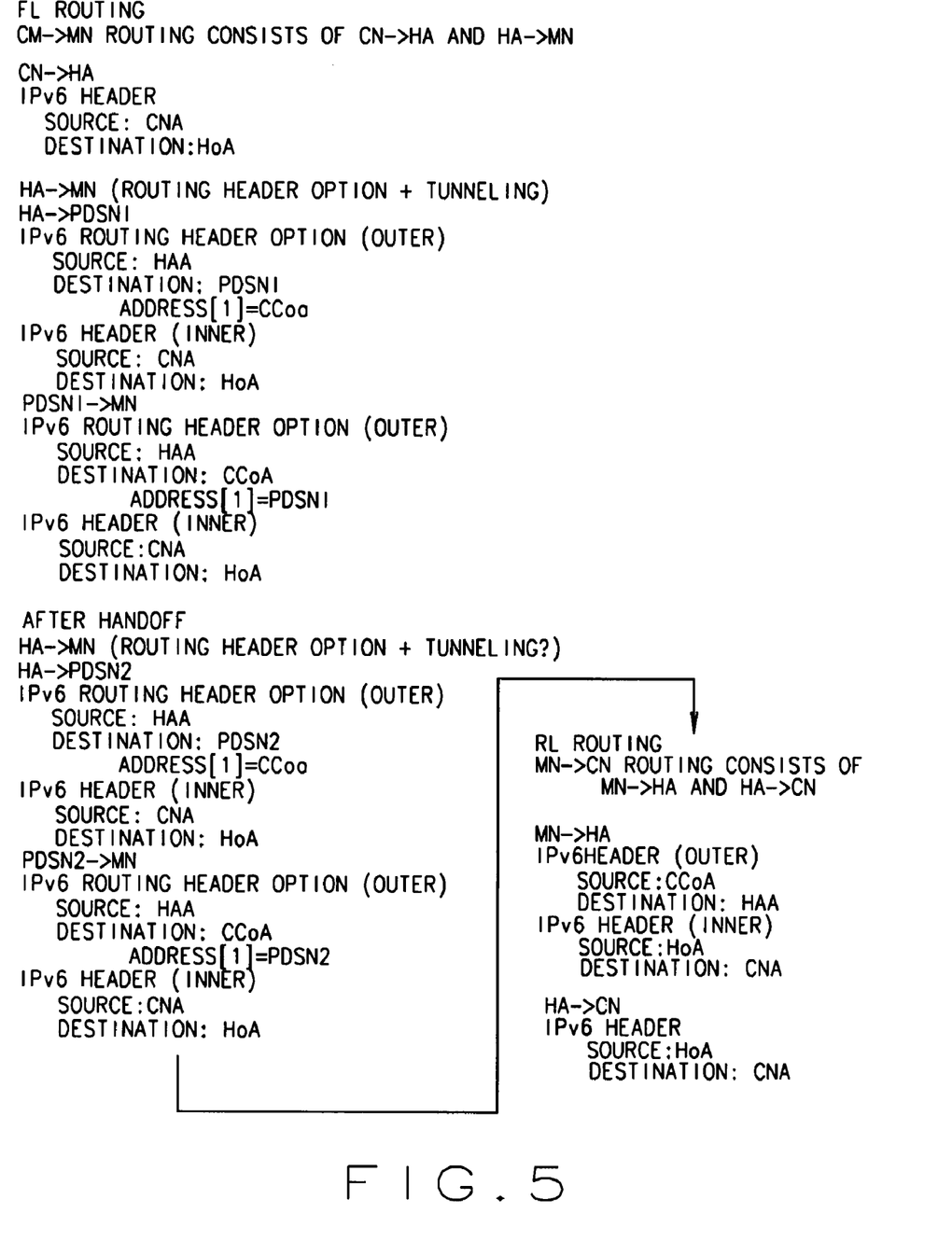
FIG. 5 illustrates exemplary packet headers that would be implemented in operation of the IP gateway to IP gateway interface shown in FIG. 1, in accordance with various embodiments of the present invention.

FIG. 5 illustrates exemplary packet headers that would be implemented in IPv6 operation of the IPGW to IPGW interface of the network 10 (shown in FIG. 1), in accordance with various embodiments of the present invention. Particularly, the exemplary packets headers illustrated in FIG. 5 are applicable to illustrate the packet flow, or routing, that occurs in FIG. 2 between a correspondent node (CN) (not shown) and the mobile AT 14. On the forward link (FL), packets sent from the CN have a source address set to CN's address (CNA) and the destination address set to HoA. The HA 24 intercepts these packets (HoA is 'owned' by the HA), adds an outer header and forwards the packets to the mobile AT 14. The source address of the outer header is set to the HA address (HAA) and the destination address is set to the address of the serving IPGW 20, e.g., a PDSN1. This binding is established through proxy registration. To ensure that the mobile AT 14 receives the packets with the appropriate header, the HA 24 adds a routing header option with the CoA included therein. The original packet remains intact. Upon receiving this packet, the serving IPGW 20 updates the outer header, e.g., sets the destination address of the outer header to the address of the router header option (CoA), and forwards the packet to the mobile AT 14. Similarly, after the handoff, upon receiving a packet from the CN, the HA 24 will forward the received packets to the target IPGW 24, e.g., a PDSN2, keeping the routing header option the same (CoA). On the reverse link (RL) packet headers are populated as per RFC 3775.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method for network based mobility management, said method comprising:

registering a mobile access terminal (AT) and a first IP gateway (IPGW) with a home agent (HA) when a wireless communication session is established between the mobile AT and the first IPGW; and transferring context information regarding the mobile AT and a proxy mobile security key obtained by the first IPGW, from the first IPGW to a second IPGW when the mobile AT moves from a first access network associated with the first IPGW to a second access network associated with the second IPGW, wherein said context information and said proxy mobile security key are transferred to the second IPGW without communicating any of said context information and said proxy mobile key with the mobile AT, and the context information and the proxy mobile security key are transferred from the first IPGW to the second IPGW without communicating any of said context information and said proxy mobile key through an authentication, authorization and accounting (AAA) server, and the proxy mobile security key is associated with the context information.

2. The method of claim 1, wherein registering the mobile AT and the first IPGW with the HA comprises establishing connectivity between the mobile AT and the HA and establishing a proxy link between the first IPGW and the HA utilizing the proxy mobile security key for the mobile AT.

3. The method of claim 1, wherein registering the mobile AT and the first IPGW with the HA comprises creating a binding at the HA binding the first IPGW with a home address (HoA) assigned to the mobile AT and a care of address (CoA) of the mobile AT, the HoA being a fixed IP address for the mobile AT that does not change and the CoA being a temporary IP address for the mobile AT that is changeable based on a location of the mobile AT.

4. The method of claim 3, wherein the CoA is generated by the mobile AT based on a network prefix of first IPGW.

5. The method of claim 1 further comprising:

creating a binding at the HA binding the second IPGW with a home address (HoA) and a care of address (CoA) of the mobile AT once the context information and the proxy mobile security key are transferred to the second IPGW, to provide a tunnel for data packets to flow between the mobile AT and the HA, via the second IPGW.

6. A method for network based mobility management, said method comprising:

establishing a proxy link between a first IP gateway (IPGW) and a home agent (HA) utilizing a proxy mobile home agent routing key obtained by the first IPGW, when a mobile IP session is initiated between a mobile access terminal (AT) and the first IPGW;

registering the mobile AT with the HA by establishing a link between the HA and the mobile AT using the same proxy mobile home agent routing key used to establish the proxy link;

transferring context information regarding the mobile AT and the proxy mobile home agent routing key from the first IPGW to a second IPGW when the mobile AT changes from communicating with a first access network to communicating with a second access network, wherein said context information and said home agent routing key are transferred to the second IPGW without communicating any of said context information and said home agent router key with the mobile AT; and establishing a link between the second IPGW and the HA utilizing the context information and the proxy mobile home agent route key acquired from the first IPGW to provide a tunnel for data packets to flow between the mobile AT and the HA, via the second IPGW, wherein the context information and the proxy mobile home agent routing key are transferred from the first IPGW to the second IPGW without communicating any of said context information and said proxy mobile home agent routing key through an authentication, authorization and accounting (AAA) server, and the proxy mobile home agent routing key is associated with the context information.

7. The method of claim 6, wherein establishing the proxy link comprises creating a binding at the HA binding the first IPGW to a home address (HoA) of the mobile AT, the HoA being a fixed IP address for the mobile AT that does not change.

8. The method of claim 7, wherein registering the mobile AT comprises updating the binding at the HA to include a care of address (CoA) of the mobile AT, thereby binding the first IPGW, the HoA and the CoA, the CoA being a temporary IP address for the mobile AT that is changeable based on a location of the mobile AT.

9. The method of claim 8, wherein the CoA is generated by the mobile AT based on a network prefix of first IPGW.

10. The method of claim 6, wherein transferring the context information and the proxy mobile home agent routing key comprises establishing a tunnel between the second access network and the second IPGW prior to transferring the context information and the proxy mobile home agent routing key.

11. The method of claim 6, wherein transferring the context information and the proxy mobile home agent routing key comprises establishing secure connectivity between the first IPGW and the second IPGW utilizing using generic routing and encapsulation (GRE) protocol keys.

12. The method of claim 6, wherein establishing a link between the second IPGW and the HA comprises establishing a binding at the HA binding the second IPGW with HoA and the CoA.

13. The method of claim 6, wherein establishing a proxy link comprises triggering a proxy mobile IP (PMIP) session upon completion of an IP configuration request from the mobile AT to the first IPGW.

14. The method of claim 6, wherein forwarding packets from the HA to the mobile AT comprises forwarding the packets through one of the first and second IPGW and changing an outer header of the IP packet to be the same as the CoA of the mobile AT.

15. A method for network based mobility management, said method comprising:
   registering a mobile access terminal (AT) with a home agent (HA) when a mobile IP session is initiated between the mobile AT and a first IP gateway (IPGW);
   registering the first IPGW with the HA by establishing a proxy link between the first IPGW and the HA utilizing a proxy mobile home agent routing key obtained by the first IPGW from an authentication, authorization and accounting (AAA);
   transferring context information regarding the mobile AT and the proxy mobile home agent routing key from the first IPGW to a second IPGW when the mobile AT hands-off communication with a first access network linked to the first IPGW to a second access network linked to the second IPGW, wherein said context information and said proxy mobile security key are transferred to the second IPGW without communicating any of said context information and said proxy mobile key with the mobile AT;
   establishing a link between the second IPGW and the HA utilizing the context information and the proxy mobile home agent route key acquired from the first IPGW to provide a tunnel for data packets to flow between the mobile AT and the HA, via the second access network and the second IPGW, wherein the context information and the proxy mobile home agent route key are transferred from the first IPGW to the second IPGW without communicating any of said context information and said proxy mobile home agent key through the AAA server, and the proxy mobile home agent routing key is associated with the context information.

16. The method of claim 15, wherein registering the mobile AT with the HA comprises creating a binding at the HA binding a home address (HoA) for the mobile AT with a care of address (CoA) for the mobile AT, the HoA being a fixed IP address for the mobile AT that does not change and the CoA being a temporary IP address for the mobile AT that is changeable based on a location of the mobile AT.

17. The method of claim 16, wherein the CoA is generated by the mobile AT based on a network prefix of first IPGW.

18. The method of claim 16, wherein registering the first IPGW with the HA comprises updating the binding at the HA to include the first IPGW, thereby binding the first IPGW, the HoA and the CoA.

19. The method of claim 15, wherein establishing a link between the second IPGW and the HA comprises establishing a binding at the HA binding the second IPGW with HoA and the CoA.

20. The method of claim 15, wherein registering the first IPGW with the HA comprises triggering a proxy mobile IP (PMIP) session upon completion of a client mobile IP configuration response from the HA to the first IPGW.

* * * * *